(12) United States Patent
Ikeda

(10) Patent No.: US 12,306,897 B2
(45) Date of Patent: May 20, 2025

(54) INFORMATION PROCESSING SYSTEM, IMAGE GENERATION SYSTEM, COMMUNICATION TERMINAL, INFORMATION PROCESSING METHOD, OR STORAGE MEDIUM

(71) Applicant: CANON KABUSHIKI KAISHA, Tokyo (JP)

(72) Inventor: Atsushi Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/300,196

(22) Filed: Apr. 13, 2023

(65) Prior Publication Data
US 2023/0409659 A1   Dec. 21, 2023

(30) Foreign Application Priority Data
May 19, 2022  (JP) ................. 2022-082527

(51) Int. Cl.
*G06F 3/0485*  (2022.01)
*G06F 16/957*  (2019.01)

(52) U.S. Cl.
CPC ........ *G06F 16/9577* (2019.01); *G06F 3/0485* (2013.01)

(58) Field of Classification Search
CPC .................. G06F 16/9577; G06F 3/0485
See application file for complete search history.

(56) References Cited

U.S. PATENT DOCUMENTS

2021/0020199 A1\*  1/2021  Doherty ............... H04N 21/812

FOREIGN PATENT DOCUMENTS

| JP | 2015053563 A | * | 3/2015 |
| JP | 2022041717 A |   | 3/2022 |

\* cited by examiner

*Primary Examiner* — Hope C Sheffield
(74) *Attorney, Agent, or Firm* — Canon U.S.A., Inc. IP Division

(57) ABSTRACT

An information processing system in which an image generation system on a network is configured to transmit image data to a communication terminal. The image generation system stores a rendering result for a browser as an image in a case where a back process, a forward process, or a scroll process of the browser is performed, stores an index number corresponding to an image, and transmits the index number to the communication terminal. The communication terminal receives the index number, stores the received index number, stores the image corresponding to the index number, and displays the image corresponding to the index number.

5 Claims, 12 Drawing Sheets

FIG.6A

| | INDEX FOR DETERMINING SCREEN UPDATE | | | |
|---|---|---|---|---|
| | 0 | 1 | 2 | ... |
| 0 | 00.png | | | |
| 1 | | | | |
| 2 | | | | |
| ... | | | | |

INDEX FOR DETERMINING REQUEST OCCURRENCE

FIG.6B

| | INDEX FOR DETERMINING SCREEN UPDATE | | | |
|---|---|---|---|---|
| | 0 | 1 | 2 | ... |
| 0 | 00.png | | | |
| 1 | 10.png | | | |
| 2 | | | | |
| ... | | | | |

INDEX FOR DETERMINING REQUEST OCCURRENCE

FIG.6C

| | INDEX FOR DETERMINING SCREEN UPDATE | | | |
|---|---|---|---|---|
| | 0 | 1 | 2 | ... |
| 0 | 00.png | | | |
| 1 | 10.png | | | |
| 2 | 20.png | | | |
| ... | | | | |

INDEX FOR DETERMINING REQUEST OCCURRENCE

FIG.8A
| | INDEX FOR DETERMINING SCREEN UPDATE | | | |
|---|---|---|---|---|
| | 0 | 1 | 2 | ... |
| 0 | 00.png | | | |
| 1 | 10.png | | | |
| 2 | 20.png | | | |
| ... | | | | |
INDEX FOR DETERMINING REQUEST OCCURRENCE
FIG.8B
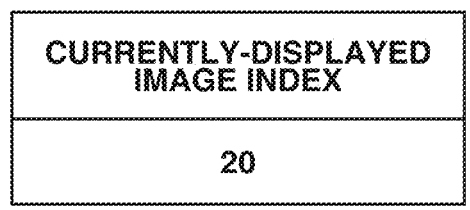
| CURRENTLY-DISPLAYED IMAGE INDEX |
|---|
| 20 |
FIG.8C
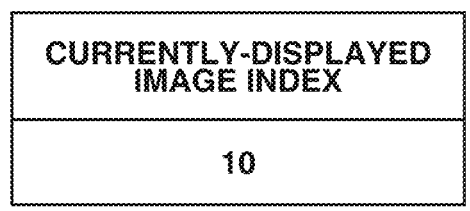
| CURRENTLY-DISPLAYED IMAGE INDEX |
|---|
| 10 |
FIG.8D
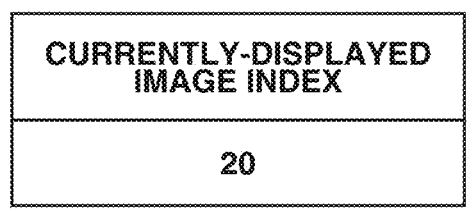
| CURRENTLY-DISPLAYED IMAGE INDEX |
|---|
| 20 |

FIG.10A

INDEX FOR DETERMINING SCREEN UPDATE

| | 0 | 1 | 2 | ... |
|---|---|---|---|---|
| 0 | 00.png | | | |
| 1 | 10.png | | | |
| 2 | 20.png | | | |
| ... | | | | |

INDEX FOR DETERMINING REQUEST OCCURRENCE

FIG.10B

INDEX FOR DETERMINING SCREEN UPDATE

| | 0 | 1 | 2 | ... |
|---|---|---|---|---|
| 0 | 00.png | | | |
| 1 | 10.png | 11.png | | |
| 2 | 20.png | | | |
| ... | | | | |

INDEX FOR DETERMINING REQUEST OCCURRENCE

FIG.10C

INDEX FOR DETERMINING SCREEN UPDATE

| | 0 | 1 | 2 | ... |
|---|---|---|---|---|
| 0 | 00.png | | | |
| 1 | 10.png | 11.png | 12.png | |
| 2 | 20.png | | | |
| ... | | | | |

INDEX FOR DETERMINING REQUEST OCCURRENCE

FIG.12A

| | | \<-- INDEX FOR DETERMINING SCREEN UPDATE --\> | | |
|---|---|---|---|---|
| | | 0 | 1 | 2 | ... |
| INDEX FOR DETERMINING REQUEST OCCURRENCE | 0 | 00.png | | | |
| | 1 | 10.png | | | |
| | 2 | 20.png | | | |
| | ... | | | | |

FIG.12B

| | | \<-- INDEX FOR DETERMINING SCREEN UPDATE --\> | | |
|---|---|---|---|---|
| | | 0 | 1 | 2 | ... |
| INDEX FOR DETERMINING REQUEST OCCURRENCE | 0 | 00.png | | | |
| | 1 | 10.png | | | |
| | 2 | 20.png | 21.png | | |
| | ... | | | | |

FIG.12C

| CURRENTLY-DISPLAYED IMAGE INDEX |
|---|
| 20 |

FIG.12D

| CURRENTLY-DISPLAYED IMAGE INDEX |
|---|
| 21 |

FIG.12E

| CURRENTLY-DISPLAYED IMAGE INDEX |
|---|
| 20 |

INFORMATION PROCESSING SYSTEM, IMAGE GENERATION SYSTEM, COMMUNICATION TERMINAL, INFORMATION PROCESSING METHOD, OR STORAGE MEDIUM

BACKGROUND

Field of the Disclosure

The present disclosure relates to a technique for displaying a web page.

Description of the Related Art

Communication terminals each equipped with a web browser (hereinafter referred to as "browser") and having a function that enables browsing of web pages on the browser are currently widespread. The communication terminals can each link with an external service by displaying a web page of the external service via the browser.

As a form of browser, there is a form called a cloud browser that generates a rendering result of a web page on a cloud server. High-computational-load processing, such as web page analysis processing and execution processing, can be executed on the server, so that a computational load on a communication terminal is eliminated (Japanese Patent Application Laid-Open No. 2022-41717).

In the cloud browser, a browser runs on a virtual machine running on a cloud server. Various device resources to be used by a personal computer (PC) are allocated to the virtual machine. For this reason, the browser running on the virtual machine can behave in a way similar to a browser running on the PC. There is also a cloud browser that uses a method of increasing a processing speed by downloading images in parallel in a plurality of sessions.

SUMMARY

According to an aspect of the present disclosure, an information processing system in which an image generation system on a network is configured to transmit image data to a communication terminal. The image generation system includes a first image storage unit configured to store a rendering result for a browser as an image in a case where a back process, a forward process, or a scroll process of the browser is performed, a first index storage unit configured to store an index number corresponding to an image, and a transmission unit configured to transmit the index number to the communication terminal. The communication terminal includes a reception unit configured to receive the index number, a second index storage unit configured to store the received index number, a second image storage unit configured to store the image corresponding to the index number, and a display unit configured to display the image corresponding to the index number.

Further features of the present disclosure will become apparent from the following description of exemplary embodiments with reference to the attached drawings.

BRIEF DESCRIPTION OF THE DRAWINGS

FIGS. 6A to 6C illustrate a change in an image index table in the screen transition of web pages.

FIGS. 8A to 8D illustrate a change in the image index table in pressing the back button and subsequently pressing the forward button.

FIGS. 10A to 10C illustrate a change in the image index table in the screen update of the web page with the button press.

FIGS. 12A to 12E illustrate a change in the image index table in the screen update of the web page by scrolling.

DESCRIPTION OF THE EMBODIMENTS

Figure 1:
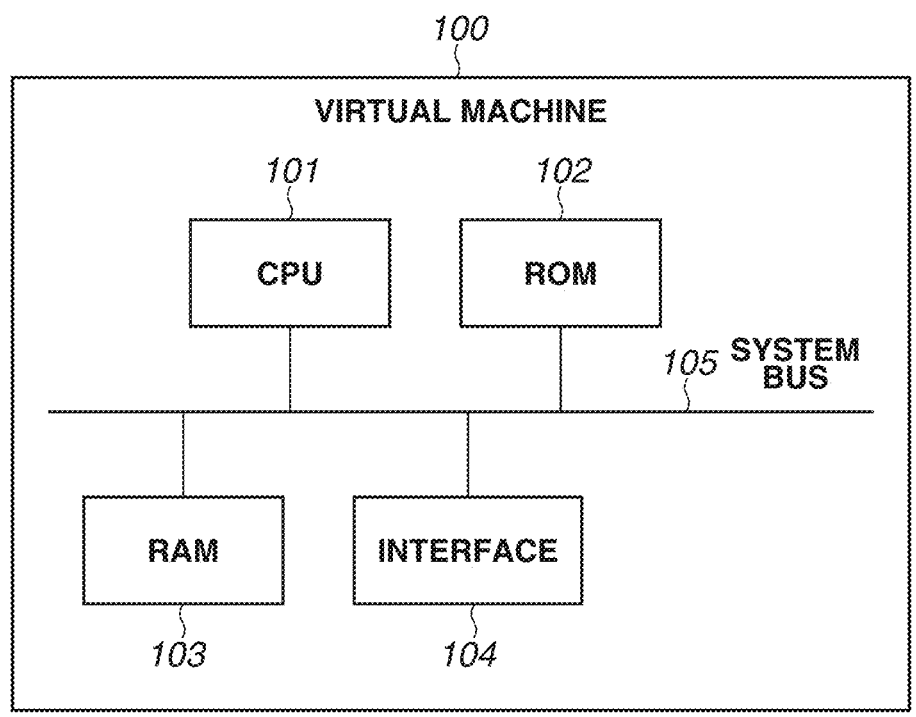
FIG. 1 is a diagram illustrating hardware components of a virtual machine.

Exemplary embodiments of the present disclosure will be described below with reference to the accompanying drawings. The following exemplary embodiments are not intended to limit the present disclosure according to the scope of claims, and not all of combinations of features described in the exemplary embodiments are essential for a solution of the present disclosure. Descriptions will be provided with similar configurations assigned the same reference numeral.

A first exemplary embodiment will be described. In the present exemplary embodiment, there will be considered a case example in which display results are changed in accordance with page transition by request, by a back or forward button press, and by screen update without request, in a cloud browser.

Here, as an example of the page transition by request, there is a case where a web page that has not been viewed is viewed. As an example for the screen update without request, there is a web page on which the background color of a specific HyperText Markup Language (HTML) element is changed by a user operation.

A configuration of a virtual machine 100 in the present exemplary embodiment will be described with reference to a block diagram in FIG. 1. In FIG. 1, a central processing unit (CPU) 101 controls the entire virtual machine 100. A read only memory (ROM) 102 stores programs and parameters for which changes are not to be made. A random access memory (RAM) 103 temporarily stores programs and data supplied from an external apparatus and other sources. An interface 104 is used for displaying held data and supplied data. These units (the CPU 101, ROM 102, RAM 103, and the interface 104) are communicably connected by a system bus 105. The virtual machine 100 may further include an interface and the like with a pointing device, such as a mouse, and an input device, such as a keyboard, for inputting data in response to receiving operations from a user. The virtual machine 100 may further include a hard disk, a memory card, and/or the like which is(are) virtually fixed and installed in the virtual machine 100. Alternatively, there may be an external storage device and the like that are virtually attachable to and detachable from the virtual machine 100, including an optical disk, such as a flexible disk (FD) or a compact disc (CD), a magnetic or optical card, an integrated circuit (IC) card, and a memory card. Furthermore, there may be a network interface and the like for connection to a network line, such as the Internet.

Figure 2:
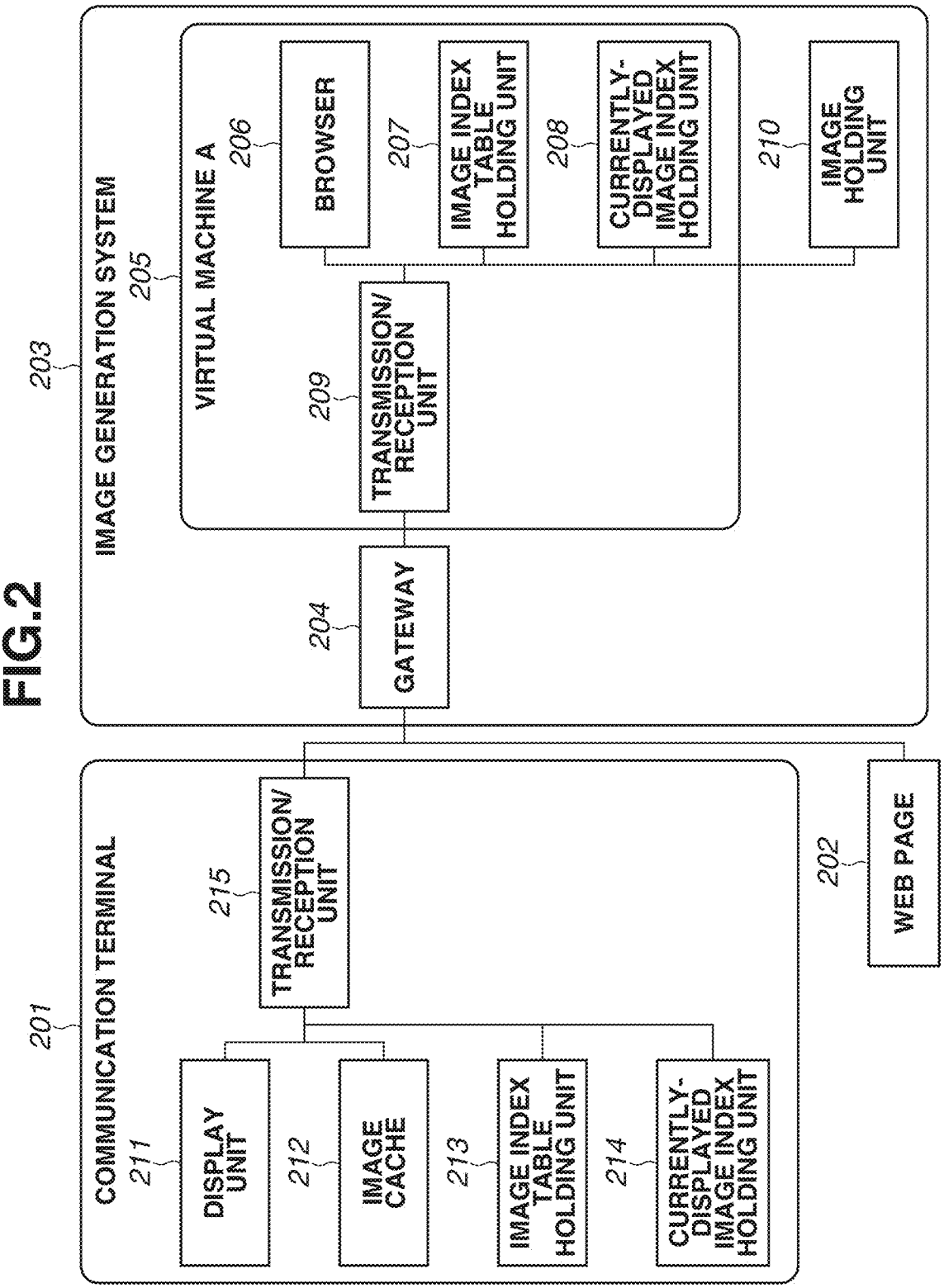
FIG. 2 is a diagram illustrating a configuration including an image generation system and a communication terminal according to one or more aspects of the present disclosure.

Next, a configuration of the cloud browser of the present exemplary embodiment will be described with reference to FIG. 2. FIG. 2 illustrates a configuration including an image generation system and a communication terminal of the first exemplary embodiment.

FIG. 2 illustrates a communication terminal 201 and an image generation system 203. In the present exemplary embodiment, the image generation system 203 is, for example, the cloud browser. The image generation system 203 is on a network, and the image generation system 203 and the communication terminal 201 can communicate with each other via the network. In the present exemplary embodiment, at least the image generation system 203 and the communication terminal 201 are included in an information processing system.

A user views a screen of the communication terminal 201. The communication terminal 201 transmits the Uniform Resource Locator (URL) of a web page 202 that the user wants to view to the image generation system 203 through a transmission/reception unit 215.

Next, the image generation system 203 accesses the web page 202 and generates a rendering result. Afterward, in a case where there is a rendering-result acquisition request from the communication terminal 201, the image generation system 203 returns the generated rendering result to the communication terminal 201 as image data, through a transmission/reception unit 209. The communication terminal 201 receives the rendering result through the transmission/reception unit 215, and presents the rendering result to the user at a display unit 211.

Here, the image generation system 203 includes a gateway 204 and a virtual machine A 205. A browser 206 that generates the rendering result runs on the virtual machine A 205. Communication between the communication terminal 201 and the virtual machine A 205 and communication between the web page 202 and the virtual machine A 205 are performed through the gateway 204.

The virtual machine A 205 registers a currently-displayed image index and a storage destination for a rendering result corresponding to this index, in an image index table holding unit (an index storage unit) 207. The virtual machine A 205 also stores the currently-displayed image index in a currently-displayed image index holding unit 208. Further, the virtual machine A 205 stores the rendering result generated by the browser 206 into an image holding unit (an image storage unit) 210.

The image generation system 203 transmits the currently-displayed image index, the rendering result, a request occurrence, or a screen update to the communication terminal 201, through the transmission/reception unit 209.

In the present exemplary embodiment, the currently-displayed image index is a number, the rendering result is an image, and each of the request occurrence and the screen update is a character string.

Here, a specification of the index will be described. The index is a two-digit number. An initial value for the index is 00.

Images generated at different URLs are each determined by the number in the tens place. Images of different rendering results generated within the identical URL are each determined by the number in the ones place.

Only ten kinds of URLs are determined using the index. Similarly, only ten kinds of screen updates within the identical URL are determined.

In a case where a new image of a rendering result is generated and a cache is updated in a state where the index number is nine, the oldest image is deleted. In other words, in a case where a screen update occurs in a state where the currently-displayed image index is 19, a previous image having an index of 10 is deleted. Afterward, the currently-displayed image index becomes 10, i.e., the image for the index of 10 is updated.

The communication terminal 201 and the image generation system 203 both operate based on the above-described specification of the index, in order to keep the consistency in index between the communication terminal 201 and the image generation system 203.

Next, a specification of the image index table will be described. The image index table indicates the correspondence between an index and a storage destination for an image corresponding to this index. In the present exemplary embodiment, a character string with an extension appended to an index number is stored in the image index table. For example, in a case where the index is 00, the character string with the extension appended to the index number is 00.png. FIG. 6A illustrates an example of the image index table. The index table is expressed in a two-dimensional array. One dimension of the index table is used to determine a history of request occurrences and/or to determine a screen update with request occurrence not being involved.

The communication terminal 201 receives the currently-displayed image index, the rendering result, the request occurrence, or the screen update transmitted from the image generation system 203, at the transmission/reception unit 215. Further, the communication terminal 201 updates an image cache (an image storage unit) 212, an image index table holding unit (an index storage unit) 213, and a currently-displayed image index holding unit 214, in accordance with the information received at the transmission/reception unit 215.

Figure 3:
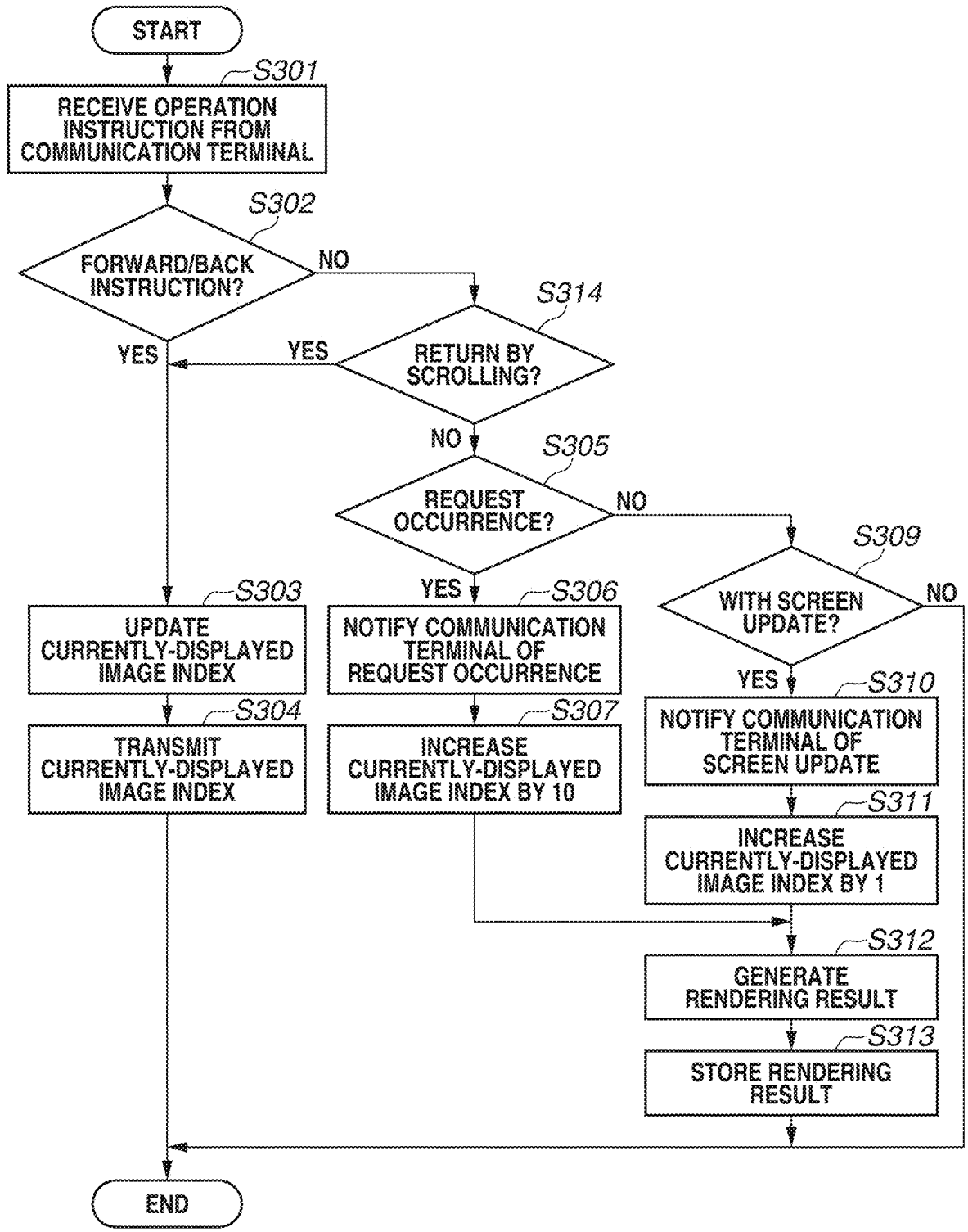
FIG. 3 is a flowchart illustrating processing of the image generation system according to one or more aspects of the present disclosure.
Figure 4:
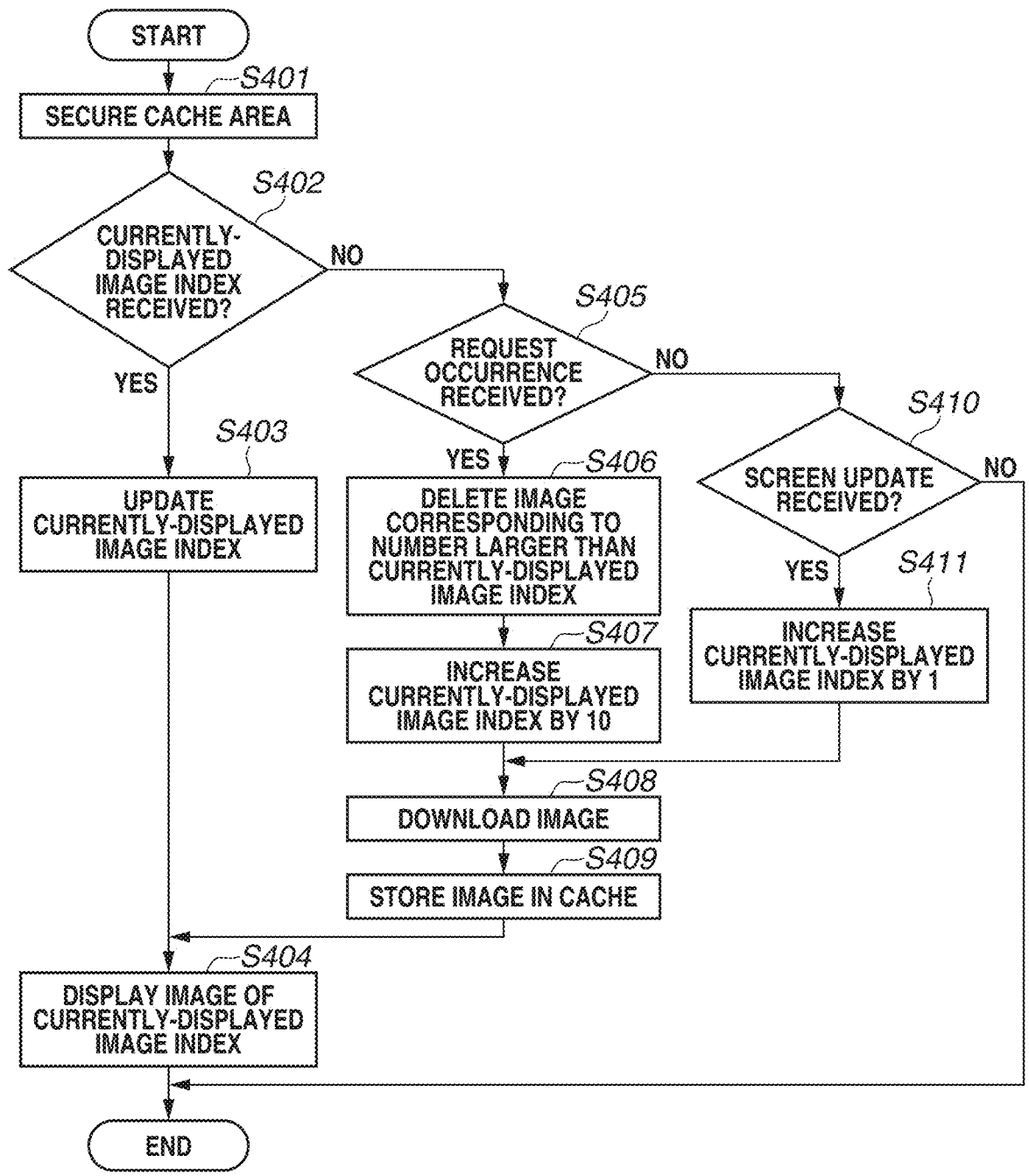
FIG. 4 is a flowchart illustrating processing of the communication terminal according to one or more aspects of the present disclosure.

FIG. 3 and FIG. 4 are flowcharts in the present exemplary embodiment. FIG. 3 illustrates processing in the image generation system 203, and FIG. 4 illustrates processing in the communication terminal 201. These pieces of processing are performed by a processor executing a program in the image generation system 203 and a processor executing a program in the communication terminal 201, respectively.

The processing in the image generation system 203 will now be described with reference to FIG. 3. In the present exemplary embodiment, in step S301, the image generation system 203 initially receives an operation instruction provided by the user, from the communication terminal 201. The operation instruction arrives at the browser 206 through the gateway 204 and then through the transmission/reception unit 209.

Subsequently, in step S302, the browser 206 determines whether the received information is an instruction to execute a forward function or back function for the browser. In a case where the result of the determination is that the received information is an instruction to execute the forward function or back function for the browser (YES in step S302), the processing proceeds to step S303. In step S303, the browser 206 updates the currently-displayed image index. Further, in step S304, the image generation system 203 transmits the currently-displayed image index to the communication terminal 201. Afterward, the processing ends.

Here, index updating processing in the forward function or back function of the browser will be described.

Initially, a specification for a case of returning to the start of a web page after transition when the transition to the web page is caused by the forward function or the back function of the browser will be described. In this case, in a case where the back function of the browser is executed, the number in the tens place of the currently-displayed image index is reduced by one. In contrast, in a case where the forward function of the browser is executed, the number in the tens place of the currently-displayed image index is increased by one.

Further, in either case, the number in the ones place of the currently-displayed image index is set to zero.

Subsequently, a specification for a case of shifting to a previously viewed position when transition to a web page is caused with the forward function or the back function for the browser will be described. In this case, in a case where the back function of the browser is executed, the number in the tens place of the currently-displayed image index is reduced by one. In contrast, in a case where the forward function of the browser is executed, the number in the tens place of the currently-displayed image index is increased by one.

Further, in either case, the number in the ones place of the currently-displayed image index is set to the largest value among values stored in the image index table holding unit 207. For example, assume that the currently-displayed image index is 12. Further, assume that a path to an image corresponding to each of 20, 21, and 22 is stored in the image index table holding unit 207. The forward button is pressed here.

In step S302, if the result of the determination is that the received information is not an instruction to execute the forward function or back function for the browser (NO in step S302), the processing proceeds to step S314. In step S314, the browser 206 determines whether the received information is an operation to return to a position displayed once in a scroll process.

If the result of the determination is that the received information is an operation to return to a position displayed once in a scroll process (YES in step S314), the processing proceeds to step S303. The image of the rendering result displayed once in the scroll process is held in the image cache 212, and thus a new image is not to be generated.

In step S314, if the result of the determination is that the received information is not an operation to return to a position displayed once in a scroll process (NO in step S314), the processing proceeds to step S305.

In step S305, it is determined whether a request for web page occurs with the corresponding instruction. Here, as a case example of the occurrence of the request for web page, there is an operation of pressing a link consisting of the <a> element.

If the result of the determination is that a request occurs (YES in step S305), the processing proceeds to step S306. In step S306, the image generation system 203 notifies the communication terminal 201 of a character string indicating the request occurrence. Next, in step S307, the currently-displayed image index stored in the currently-displayed image index holding unit 208 is increased by 10.

In step S305, if the result of the determination is that a request does not occur (NO in step S305), the processing proceeds to step S309. In step S309, it is determined whether a screen update occurs.

In step S309, if the result of the determination is that a screen update occurs (YES in step S309), the processing proceeds to step S310. In step S310, the image generation system 203 transmits a character string indicating the screen update to the communication terminal 201. Next, in step S311, the currently-displayed image index stored in the currently-displayed image index holding unit 208 is increased by one.

Here, as an example of the case where the request for web page does not occur and the screen is updated, there is an instruction by clicking an element, on a web page including JavaScript (trade mark) that changes the background color when the element is clicked.

In step S309, if the result of the determination is that a screen update does not occur (NO in step S309), the processing ends.

In step S312 following the process of step S307 or step S311, a rendering result is generated. Here, the process of generating the rendering result includes a process of acquiring the web page 202 corresponding to the URL received from the communication terminal 201, and a process of storing the result of interpreting and executing the web page 202, as an image. Here, the web page 202 includes an HTML document, JavaScript (trade mark), a Cascading Style Sheets (CSS) file, an external font, and an image.

Subsequently, in step S313, the browser 206 stores the rendering result into the image holding unit 210. Afterward, the processing ends.

Next, the processing in the communication terminal 201 will be described with reference to FIG. 4. Initially in step S401, the communication terminal 201 secures a cache area. Here, the cache area is an area for storing the rendering result received from the image generation system 203.

Next in step S402, the communication terminal 201 determines whether the currently-displayed image index is received. If the result of the determination is that the currently-displayed image index is received (YES in step S402), the processing proceeds to step S403. In step S403, the communication terminal 201 updates the currently-displayed image index in the currently-displayed image index holding unit 214, and adds the received index to the image index table holding unit 213. In step S404, the image corresponding to the currently-displayed image index is then acquired from the image cache 212 and the acquired image is displayed on the display unit 211.

In step S402, if the result of the determination is that the currently-displayed image index is not received (NO in step S402), the processing proceeds to step S405. In step S405, the communication terminal 201 determines whether a request occurrence is received. If the result of the determination is that a request occurrence is received (YES in step S405), the processing proceeds to step S406. In step S406, the communication terminal 201 deletes an image corresponding to a number larger than the currently-displayed image index from the image cache 212.

The occurrence of a request means that a URL not remaining in the history of the browser is to be displayed. Here, the table of a URL to be referred to in the forward function is overwritten in the browser.

For example, assume that http://AAA.html is currently displayed. Here, assume that a URL to be next referred to in the forward function is http//BBB.html.

Here, assume that a request for http://CCC.html has occurred. In this case, the table of the URL to be referred to in the forward function held in the browser is deleted once. Further, the URL to be referred to immediately before in the back function becomes http://AAA.html, and http://CCC.html is displayed.

The operation in step S406 is a process for keeping consistency with the above-described operation in the browser, and is also a process for effectively using the cache area.

Subsequently, in step S407, the communication terminal 201 increases the currently-displayed image index by 10. In a case where the index of an image displayed immediately before is 00, the currently-displayed image index is changed to 10 through the operation in step S407. Next, in step S408, the communication terminal 201 downloads the image corresponding to the currently-displayed image index from the image generation system 203. In step S409, the communication terminal 201 stores the image downloaded in step S408 into the image cache 212.

In step S405, if the result of the determination is that a request occurrence is not received (NO in step S405), the processing proceeds to step S410. In step S410, the communication terminal 201 determines whether a screen update is received. If the result of the determination is that a screen update is received (YES in step S410), the processing proceeds to step S411. In step S411, the communication terminal 201 increases the currently-displayed image index by one. Further, the processing proceeds to step S408.

If the result of the determination is that a screen update is not received (NO in step S410), the processing ends.

Here, specific examples of the transition of web pages and the screen update and specific examples of the change in the image index table will be described with reference to FIGS. 5A to 5C, FIGS. 6A to 6C, FIGS. 7A to 7C, FIGS. 8A to 8D, FIGS. 9A to 9C, and FIGS. 10A to 10C.

FIGS. 5A to 5C and FIGS. 6A to 6C illustrate an example in which three web pages having different URLs are sequentially displayed. In the present exemplary embodiment, this scenario will be referred to as the first scenario.

Figure 5A:
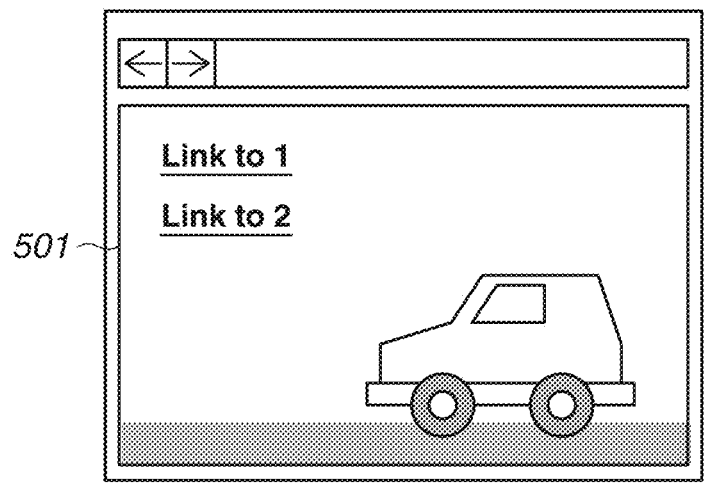
FIGS. 5A to 5C illustrate an example of screen transition of web pages.
Figure 5B:
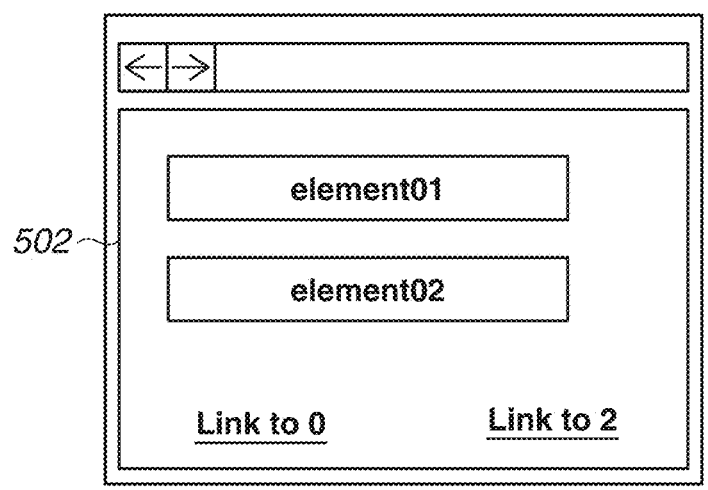
Figure 5C:
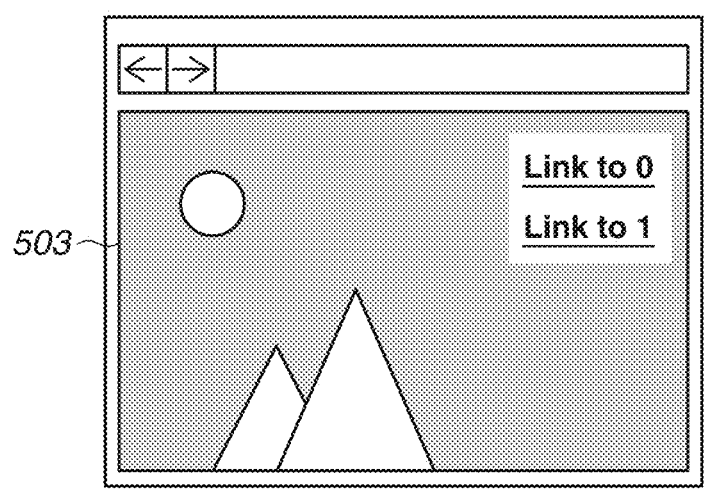

FIGS. 5A, 5B, and 5C illustrate web pages 501, 502, and 503, respectively, which have different URLs. FIGS. 6A to 6C illustrate a change in the image index table.

The web page 501 includes a link indicated by "link to 1" and a link indicated by "link to 2", in addition to a picture of a car. The link indicated by "link to 1" links to the web page 502. The link indicated by "link to 2" links to the web page 503.

The web page 502 includes a link indicated by "link to 0" and a link indicated by "link to 2", in addition to an element indicated by "element01" and an element indicated by "element02". The link indicated by "link to 0" links to the web page 501. The link indicated by "link to 2" links to the web page 503.

The web page 503 includes a link indicated by "link to 0" and a link indicated by "link to 1", in addition to a landscape. The link indicated by "link to 0" links to the web page 501. The link indicated by "link to 1" links to the web page 502.

Here, the user initially displays the web page 501, and presses the link indicated by "link to 1" on the web page 501. The user subsequently presses the link indicated by "link to 2" on the web page 502.

In the first scenario, the image index table stored in the image index table holding unit 207 changes in a manner illustrated in FIGS. 6A to 6C.

Initially, when the browser displays the web page 501, a character string "00.png" is stored into the image index table as illustrated in FIG. 6A. The image 00.png is one into which the rendering result of the web page 501 is imaged. The image 00.png is stored into the image holding unit 210.

The image generation system 203 then transmits the currently-displayed image index 00 to the communication terminal 201. The communication terminal 201 receives the currently-displayed image index 00, downloads the image 00.png from the image generation system 203, and displays the image 00.png on the display unit 211.

Next, when the browser displays the web page 502, a character string "10.png" is added to the image index table as illustrated in FIG. 6B. The web pages 502 and 501 are different, and thus there is no cache corresponding to the web page 502, so that a request occurs. Thus, the image index corresponding to the web page 502 increases by 10, specifically, from 00 to 10. The image 10.png is one into which the rendering result of the web page 502 is imaged. The image 10.png is stored into the image holding unit 210.

The image generation system 203 then transmits the currently-displayed image index 10 to the communication terminal 201. The communication terminal 201 receives the currently-displayed image index 10, downloads the image 10.png from the image generation system 203, and displays the image 10.png on the display unit 211.

Subsequently, when the browser displays the web page 503, a character string "20.png" is added to the image index table as illustrated in FIG. 6C. The web pages 503 and 502 are different, and thus there is no cache corresponding to the web page 503, so that a request occurs. Thus, the image index corresponding to the web page 503 increases by 10, specifically, from 10 to 20. The image 20.png is one into which the rendering result of the web page 503 is imaged. The image 20.png is stored into the image holding unit 210.

The image generation system 203 then transmits the currently-displayed image index 20 to the communication terminal 201. The communication terminal 201 receives the currently-displayed image index 20, downloads the image 20.png from the image generation system 203, and displays the image 20.png on the display unit 211.

FIGS. 7A to 7C and FIGS. 8A to 8D illustrate an example in which the back button is pressed and the forward button is subsequently pressed, after the first scenario. In the present exemplary embodiment, this scenario after the first scenario will be referred to as the second scenario. Web pages to be used in the second scenario are the web pages 502 and 503.

Figure 7A:
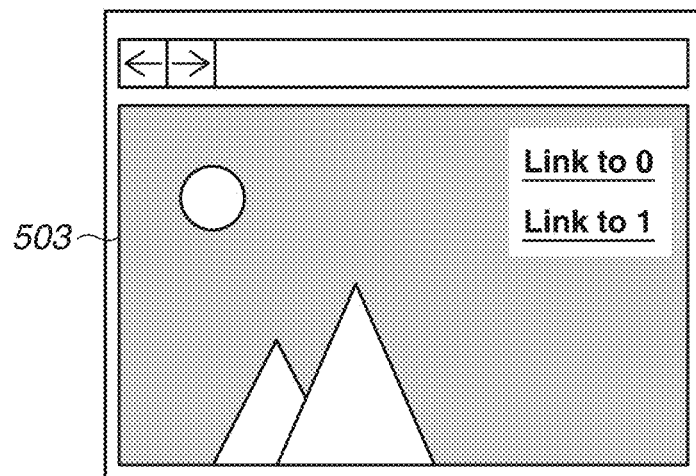
FIGS. 7A to 7C illustrate an example of pressing a back button and subsequently pressing a forward button.
Figure 7B:
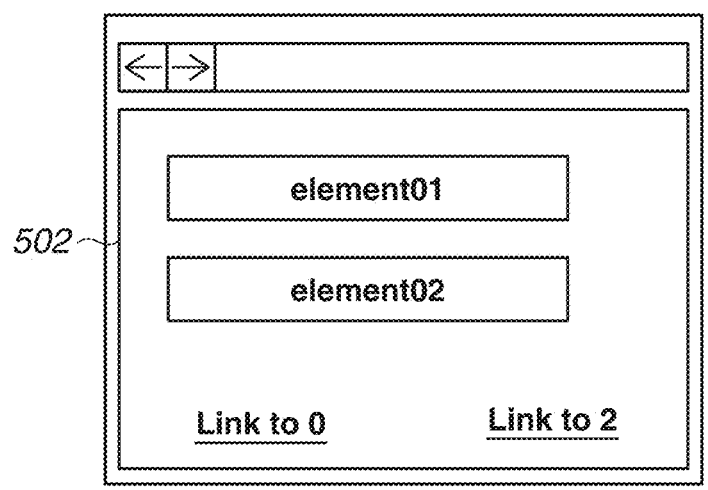
Figure 7C:
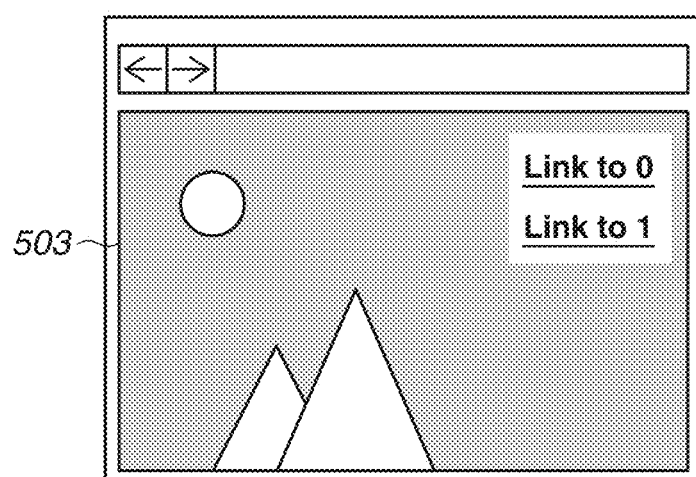

FIGS. 7A to 7C illustrate display results of the web pages 503 and 502. FIG. 8A illustrates the image index table, and FIGS. 8B to 8D illustrate a change in the currently-displayed image index. In the second scenario, the cache for the image is used and thus the image index table does not change.

Initially in the second scenario, in a case where the user presses the back button, the communication terminal 201 transmits an instruction of the back button press to the image generation system 203. When the browser returns from the web page 503 to the web page 502, the currently-displayed image index changes from 20 in FIG. 8B to 10 in FIG. 8C. The image generation system 203 then transmits the currently-displayed image index 10 to the communication terminal 201. The communication terminal 201 then receives the currently-displayed image index 10, and displays the image 10.png on the display unit 211 with reference to the image 10.png in the image cache 212.

Subsequently, in a case where the user presses the forward button, the communication terminal 201 transmits an instruction of the forward button press to the image generation system 203. When the browser shifts from the web page 502 to the web page 503, the currently-displayed image index changes from 10 in FIG. 8C to 20 in FIG. 8D. The image generation system 203 then transmits the currently-displayed image index to the communication terminal 201. Further, the communication terminal 201 receives the currently-displayed image index 20, and displays the image 20.png on the display unit 211 with reference to the image 20.png in the image cache 212.

In the second scenario, the communication terminal 201 displays the image on the display unit 211 without downloading the image of the rendering result from the image generation system 203, so that the back function and the forward function of the browser can be quickly performed.

FIGS. 9A to 9C and FIGS. 10A to 10C illustrate an example in which the web page 502 is displayed by pressing the back button and the web page 502 is operated, after the first scenario. In the present exemplary embodiment, a scenario in which the time when the web page 502 is displayed after the first scenario is the starting point and the web page 502 is subsequently operated will be referred to as the third scenario. The web page to be used in the third scenario is the web page 502 as with the first scenario.

The web page 502 includes an element indicated by "element01" and an element indicated by "element02". In the element indicated by each of "element01" and "element02", JavaScript (trademark) is set so that the color changes when the element is pressed.

Figure 9A:
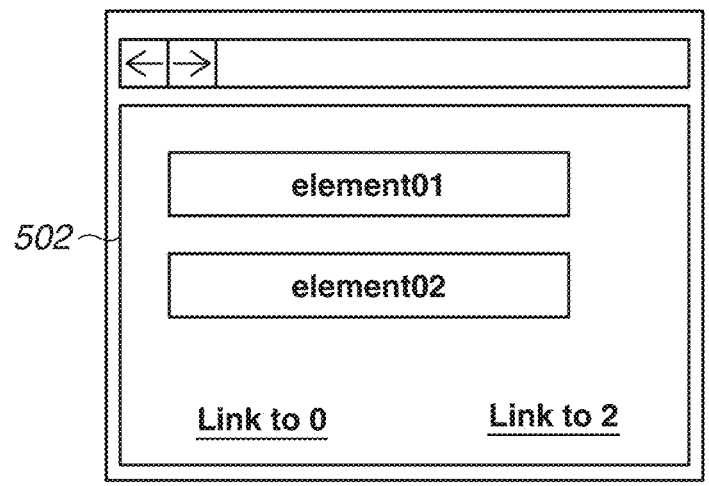
FIGS. 9A to 9C illustrate an example of screen update of a web page with a button press.
Figure 9B:
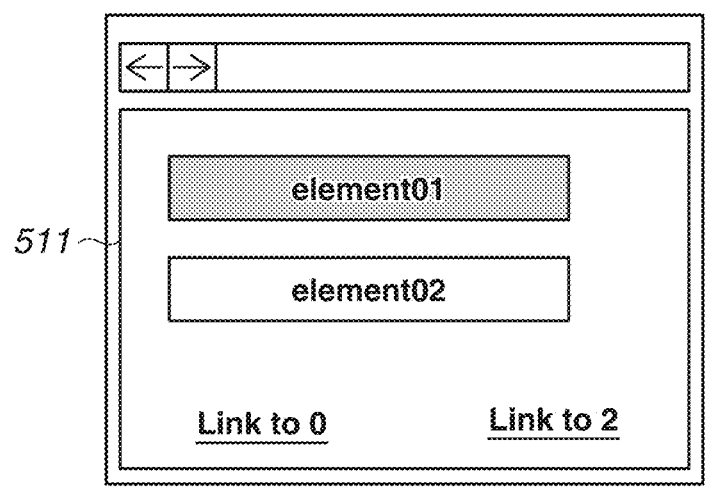
Figure 9C:
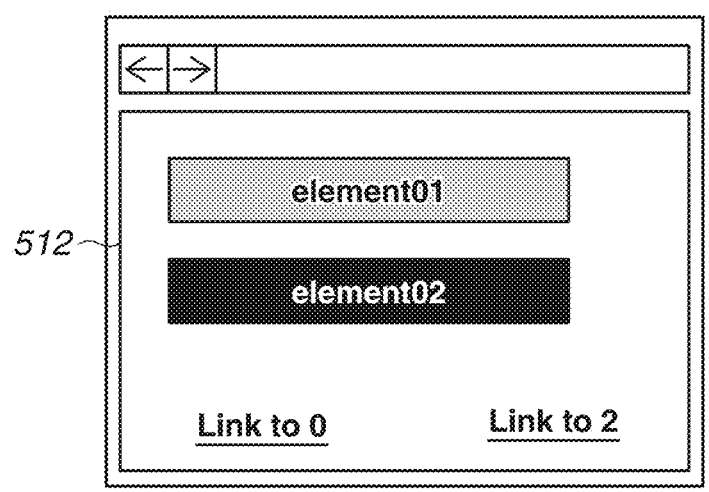

FIGS. 9A to 9C illustrate a change in the display result of the web page 502 in the third scenario. FIGS. 10A to 10C illustrate a change in the image index table in the third scenario.

In the third scenario, the user presses the element indicated by "element01" and subsequently presses the element indicated by "element02".

FIG. 9A illustrates a display result before the user presses the element indicated by "element01". When the user presses the element indicated by "element01" at this moment, the display result illustrated in FIG. 9B appears. Further, when the user presses the element indicated by "element02", the display result illustrated in FIG. 9C appears. The web pages illustrated in FIGS. 9A to 9C all have the same URL, and thus a request does not occur. However, the element indicated by each of "element01" and "element02" changes in color by being pressed, and thus a screen update occurs.

When the browser is in the state illustrated in FIG. 9A, the image index table stored in the image index table holding unit 207 is the table illustrated in FIG. 10A. The currently-displayed image index is 10, and the rendering result in FIG. 9A is the image 10.png.

Here, when the user presses the element indicated by "element01", the state of the browser changes to the state illustrated in FIG. 9B, and a screen update occurs, and thus the currently-displayed image index is increased by 1, to 11.

The rendering result in FIG. 9B is then stored into the image holding unit 210 as an image 11.png.

The image generation system 203 then transmits the currently-displayed image index 11 to the communication terminal 201. The communication terminal 201 receives the currently-displayed image index 11, downloads the image 11.png from the image generation system 203, and displays the image 11.png on the display unit 211.

Further, when the user presses the element indicated by "element02", the state of the browser changes to the state illustrated in FIG. 9C, and a screen update occurs, and thus the currently-displayed image index is increased by 1, to 12.

The rendering result in FIG. 9C is then stored into the image holding unit 210 as an image 12.png.

Afterward, the image generation system 203 transmits the currently-displayed image index 12 to the communication terminal 201. The communication terminal 201 receives the currently-displayed image index 12, downloads the image 12.png from the image generation system 203, and displays the image 12.png on the display unit 211.

FIGS. 11A to 11C and FIGS. 12A to 12E illustrate an example in which the screen is scrolled down once and subsequently scrolled again to the original position, after the first scenario. In the present exemplary embodiment, a scenario in which the time when the web page 503 is displayed after the first scenario is the starting point and the web page 503 is subsequently operated will be referred to as the fourth scenario. The web page to be used in the fourth scenario is the web page 503.

In the fourth scenario, the number of pixels to move in one scroll process is a fixed value. Thus, in the fourth scenario, when scrolling down is performed and subsequently scrolling up is performed, the image returns to the original position.

Figure 11A:
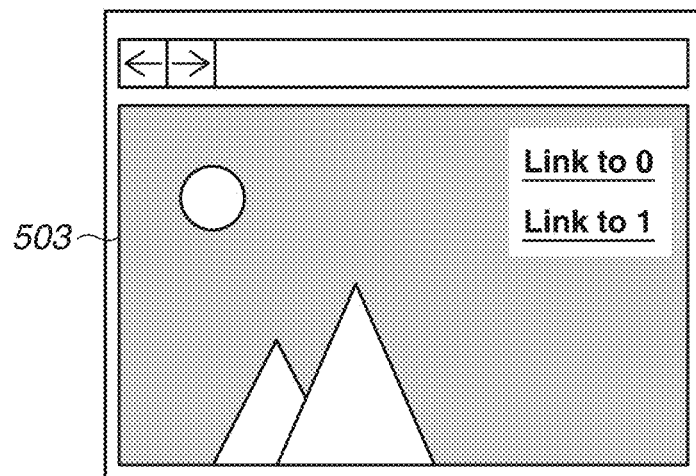
FIGS. 11A to 11C illustrate an example of screen update of a web page by scrolling.
Figure 11B:
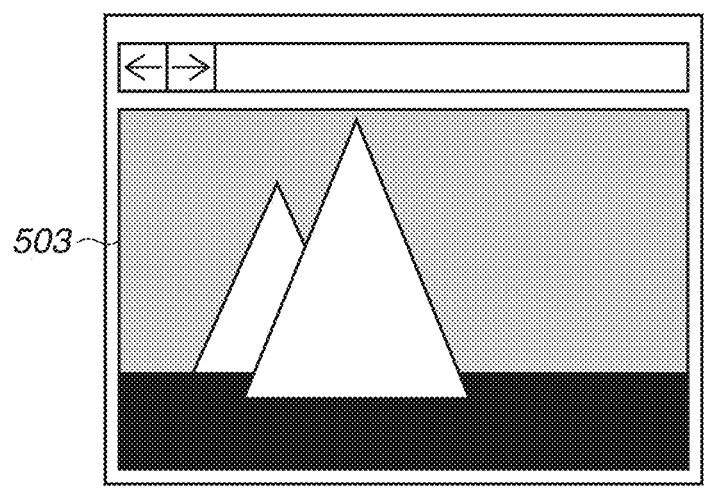
Figure 11C:
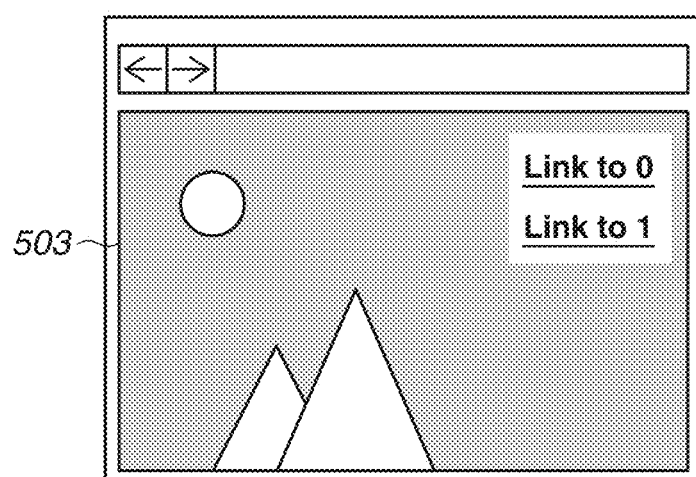

FIGS. 11A to 11C illustrate a change in the display result of the web page 503 in the fourth scenario. FIGS. 12A and 12B illustrate a change in the image index table in the fourth scenario. FIGS. 12C to 12E illustrate a change in the currently-displayed image index in the fourth scenario.

FIG. 11A illustrates a display result before the user scrolls down. When the user scrolls down in this state, the display result illustrated in FIG. 11B appears. Further, when the user scrolls up, the display result illustrated in FIG. 11C appears. The web pages in FIGS. 11A to 11C all have the same URL, and thus a request does not occur. However, the rendering result changes by scrolling, and thus a screen update occurs.

When the browser is in the state illustrated in FIG. 11A, the image index table stored in the image index table holding unit 207 is the table illustrated in FIG. 12A. The currently-displayed image index is 20 as illustrated in FIG. 12C, and the rendering result in FIG. 11A is the image 20.png. The rendering result in FIG. 11A is then stored in the image holding unit 210 as the image 20.png.

When the user scrolls down here, the state of the browser changes to the state illustrated in FIG. 11B, and a screen update occurs, and thus the currently-displayed image index is increased by 1, to 21, as illustrated in FIG. 12D. The rendering result in FIG. 11B is then stored into the image holding unit 210 as an image 21.png.

The image generation system 203 then transmits the currently-displayed image index 21 to the communication terminal 201. The communication terminal 201 receives the currently-displayed image index 21, downloads the image 21.png from the image generation system 203, and displays the image 21.png on the display unit 211.

Further, when the user scrolls up, the state of the browser changes to the state illustrated in FIG. 11C. This scroll operation is determined to be an operation to return to a position that has been displayed once, in step S314. The rendering result in FIG. 11B is stored in the image holding unit 210 and the image cache 212 as the image 21.png, and is reusable. Thus, when the user scrolls up, the currently-displayed image index is reduced by 1 and thereby returns to 20, as illustrated in FIG. 12E.

Afterward, the image generation system 203 transmits the currently-displayed image index 20 to the communication terminal 201. In this process, the image generation system 203 does not transmit a request occurrence and a screen update.

The communication terminal 201 receives the currently-displayed image index and displays the image 20.png on the display unit 211 with reference to the image in the image cache 212.

In the fourth scenario, the communication terminal 201 displays the image on the display unit 211 without downloading the image of the rendering result from the image generation system 203, so that the scroll function of the browser can be quickly performed.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-082527, filed May 19, 2022, which is hereby incorporated by reference herein in its entirety.

What is claimed is:

1. An information processing system in which an image generation system on a network is configured to transmit image data to a communication terminal,
the image generation system including:
at least one memory storing instructions; and
at least one processor executing the instructions causing the image generation system to function as:
a server-side web browser, wherein the server-side web browser accesses an external server which is not included in the information processing system, using a user-designated Uniform Resource Locator (URL), obtains web data including at least a HyperText Markup Language (HTML) file, and generates a browsing rendering result obtained by the server-side web browser interpreting the obtained web data;
a first image storage unit configured to store an image data file of the browsing rendering result that is obtained by capturing the browsing rendering result displayed on the server-side web browser based on a back process, a forward process, or a scroll process of the server-side web browser being performed;
a first index storage unit configured to store index numbers corresponding to image data files, wherein each image data files corresponds to a different browsing rendering result-corresponding to an image-data, and the index numbers are used to determine a history of request occurrences; and
a transmission unit configured to transmit a currently-displayed image index number to the communication terminal, wherein the transmission unit further transmits the image data file corresponding to the currently-displayed image index number in a case where new image file data that does not correspond to an index number stored in advance in the first index storage unit is stored in the first image storage unit due to an occurrence of a change in the browsing rendering result on the server-side web browser,
the communication terminal including:
at least one memory storing instructions; and
at least one processor executing the instructions causing the communication terminal to function as:
a reception unit configured to receive the currently-displayed index number;
a second index storage unit configured to store the received currently-displayed index number;
a second image storage unit configured to store the image data file corresponding to the received currently-displayed index number received from the image generation system; and
a display control unit configured to display the image file data corresponding to the received currently-displayed index number wherein the display of the image file data is executed without performing any HTML rendering processing on the communication terminal side.

2. The information processing system according to claim 1,
wherein the image generation system further includes a notification unit configured to notify the communication terminal of a request occurrence in a case where a request for a web page occurs in the browser; and
wherein the communication terminal further includes a deletion unit configured to delete, from the respective second image storage unit, an image corresponding to an index number larger than a stored index number, in a case where the request occurrence from the image generation system is received.

3. The information processing system according to claim 1, wherein the first index storage unit and the second index storage unit each store an index table expressed in a two-dimensional array,
wherein determining the history of request occurrences and a screen update without request occurrence is based on at least one dimension in the index table expressed in the two-dimensional array.

4. An information processing method in an information processing system in which an image generation system on a network is configured to transmit image data to a communication terminal, the information processing method comprising:
a server-side web browser, wherein the server-side web browser accesses an external server which is not included in the information processing system, using a user-designated Uniform Resource Locator (URL), obtains web data including at least a HyperText Markup Language (HTML) file, and generates a browsing rendering result obtained by the server-side web browser interpreting the obtained web data;
causing the image generation system to:
store an image data file of the browsing rendering result that is obtained by capturing the browsing rendering result displayed on the server-side web browser based on a back process, a forward process, or a scroll process of the server-side web browser being performed;
store index numbers corresponding to image data files, wherein each image data files corresponds to a different browsing rendering result corresponding to an image data, and the index numbers are used to determine a history of request occurrences; and
transmit a currently-displayed image index number to the communication terminal, wherein the transmission unit further transmits the image data file corresponding to the currently-displayed image index number in a case where new image file data that does not correspond to an index number stored in advance in the first index storage unit is stored in the first image storage unit due to an occurrence of a change in the browsing rendering result on the server-side web browser
causing the communication terminal to:
receive the currently-displayed index number;
store the received currently-displayed index number;
store the image data file corresponding to the received currently-displayed index number received from the image generation system; and
display the image file data corresponding to the received currently-displayed index number wherein the display of the image file data is executed without performing any HTML rendering processing on the communication terminal side.

5. A non-transitory computer readable storage medium storing a program for causing a computer to execute an information processing method in an information processing system in which an image generation system on a network is configured to transmit image data to a communication terminal, the information processing method comprising:
a server-side web browser, wherein the server-side web browser accesses an external server which is not included in the information processing system, using a user-designated Uniform Resource Locator (URL), obtains web data including at least a HyperText Markup Language (HTML) file, and generates a browsing rendering result obtained by the server-side web browser interpreting the obtained web data;
causing the image generation system to:
store an image data file of the browsing rendering result that is obtained by capturing the browsing rendering result displayed on the server-side web browser based on a back process, a forward process, or a scroll process of the server-side web browser being performed;
store index numbers corresponding to image data files, wherein each image data files corresponds to a different browsing rendering result corresponding to an image data, and the index numbers are used to determine a history of request occurrences; and
transmit a currently-displayed image index number to the communication terminal, wherein the transmission unit further transmits the image data file corresponding to the currently-displayed image index number in a case where new image file data that does not correspond to an index number stored in advance in the first index storage unit is stored in the first image storage unit due to an occurrence of a change in the browsing rendering result on the server-side web browser
causing the communication terminal to:
receive the currently-displayed index number;
store the received currently-displayed index number;
store the image data file corresponding to the received currently-displayed index number received from the image generation system; and
display the image file data corresponding to the received currently-displayed index number wherein the display of the image file data is executed without performing any HTML rendering processing on the communication terminal side.

* * * * *